US011218334B2

(12) United States Patent
Stuart-Muirk et al.

(10) Patent No.: US 11,218,334 B2
(45) Date of Patent: Jan. 4, 2022

(54) METHOD AND SYSTEM FOR PROVIDING LIMITED CONTROLLER ACCESS TO A MESH NETWORK OF MEDIA RENDERING DEVICES

(71) Applicant: D&M Holdings, Inc., Kanagawa (JP)

(72) Inventors: Evan Stuart-Muirk, Central (HK); Nicholas Murrells, San Diego, CA (US); Brendon Stead, Carlsbad, CA (US)

(73) Assignee: D&M Holdings, Inc., Kanagawa (JP)

( * ) Notice: Subject to any disclaimer, the term of this patent is extended or adjusted under 35 U.S.C. 154(b) by 0 days.

(21) Appl. No.: 16/646,293

(22) PCT Filed: Sep. 12, 2018

(86) PCT No.: PCT/US2018/050588
§ 371 (c)(1),
(2) Date: Mar. 11, 2020

(87) PCT Pub. No.: WO2019/055468
PCT Pub. Date: Mar. 21, 2019

(65) Prior Publication Data
US 2020/0274728 A1  Aug. 27, 2020

Related U.S. Application Data

(60) Provisional application No. 62/557,360, filed on Sep. 12, 2017.

(51) Int. Cl.
*H04L 12/28* (2006.01)
*H04W 84/22* (2009.01)

(52) U.S. Cl.
CPC ...... *H04L 12/2838* (2013.01); *H04L 12/2816* (2013.01); *H04L 2012/2841* (2013.01); *H04L 2012/2849* (2013.01); *H04W 84/22* (2013.01)

(58) Field of Classification Search
CPC ............. H04L 12/2838; H04L 12/2816; H04L 2012/2841; H04L 2012/2849; H04W 84/22; H04W 4/80
See application file for complete search history.

(56) References Cited

U.S. PATENT DOCUMENTS 10,075,334 B1 *  9/2018  Kozura ............... H04W 12/086
2009/0077623 A1 *  3/2009  Baum ................. H04L 12/2818
726/1

(Continued)

FOREIGN PATENT DOCUMENTS

EP   WO2016/183317   11/2016

OTHER PUBLICATIONS

Z. Pang, Y. Cheng, M. E. Johansson and G. Bag, "Preliminary Study on Wireless Home Automation Systems with Both Cloud-Based Mode and Stand-Alone Mode," 2014 IEEE 17th International Conference on Computational Science and Engineering, Chengdu, China, 2014, pp. 970-975, doi: 10.1109/CSE.2014.194. (Year: 2014).*

(Continued)

*Primary Examiner* — Ayaz R Sheikh
*Assistant Examiner* — Tarell A Hampton
(74) *Attorney, Agent, or Firm* — Peter A. Nieves; Sheehan Phinney Bass & Green PA

(57) ABSTRACT

A system provides limited controller access to a mesh network of media rendering devices in a primary communication network via an access point providing network connectivity to a local area network (LAN). A first media rendering device in communication with the LAN includes a secondary network transceiver providing a secondary network distinct from the LAN. A second media rendering device is in communication with the first media rendering device via the secondary network. A controller is configured to communicate with the first media rendering device via the (Continued)

LAN and/or the secondary network. The first media rendering device is configured to convey a command from the controller to the second media rendering device via the secondary network.

7 Claims, 8 Drawing Sheets

(56) References Cited

U.S. PATENT DOCUMENTS

| | | | | |
|---|---|---|---|---|
| 2009/0082888 | A1* | 3/2009 | Johansen | H04L 65/607 |
| | | | | 700/94 |
| 2009/0268754 | A1 | 10/2009 | Palm et al. | |
| 2010/0023865 | A1* | 1/2010 | Fulker | H04L 67/025 |
| | | | | 715/734 |
| 2010/0309049 | A1 | 9/2010 | Reunamaki et al. | |
| 2011/0274020 | A1 | 10/2011 | Filoso et al. | |
| 2013/0314244 | A1* | 11/2013 | Hershberger | G01D 4/002 |
| | | | | 340/870.02 |
| 2016/0182482 | A1* | 6/2016 | Koo | H04L 63/08 |
| | | | | 726/7 |
| 2016/0233946 | A1* | 8/2016 | Wengrovitz | G05D 1/0011 |
| 2016/0241660 | A1* | 8/2016 | Nhu | H04L 67/04 |
| 2017/0006521 | A1 | 1/2017 | Brandt | |
| 2017/0063967 | A1* | 3/2017 | Kitchen | H04L 67/02 |
| 2017/0230845 | A1 | 8/2017 | Pajona et al. | |

OTHER PUBLICATIONS

S. Nuratch, "The IIoT devices to cloud gateway design and implementation based on microcontroller for real-time monitoring and control in automation systems," 2017 12th IEEE Conference on Industrial Electronics and Applications (ICIEA), Siem Reap, Cambodia, 2017, pp. 919-923, (Year: 2017).*

G. V. Vivek and M. P. Sunil, "Enabling IOT services using WIFI—ZigBee gateway for a home automation system," 2015 IEEE International Conference on Research in Computational Intelligence and Communication Networks (ICRCICN), Kolkata, India, 2015, pp. 77-80, doi: 10.1109/ICRCICN.2015.7434213. (Year: 2015).*

M. Kasmi, F. Bahloul and H. Tkitek, "Smart home based on Internet of Things and cloud computing," 2016 7th International Conference on Sciences of Electronics, Technologies of Information and Telecommunications (SETIT), Hammamet, Tunisia, 2016, pp. 82-86, doi: 10.1109/SETIT.2016.7939846. (Year: 2016).*

International Search Report for PCT/US18/50588, dated Nov. 30, 2018.

Extended European Search Report for EP18857063.4 dated Nov. 13, 2020.

* cited by examiner

```
┌─────────────────────────────────────────────────────────────┐
│ A mesh network is configured for a first media rendering   │
│ device, a second media rendering device, and a third        │
│ media rendering device.                                     │
│                          410                                │
└─────────────────────────────────────────────────────────────┘
                              │
                              ▼
┌─────────────────────────────────────────────────────────────┐
│ A first parameter measuring a signal quality on the mesh   │
│ network between the first media rendering device and the   │
│ second media rendering device is determined.               │
│                          420                                │
└─────────────────────────────────────────────────────────────┘
                              │
                              ▼
┌─────────────────────────────────────────────────────────────┐
│ A second parameter measuring a network quality of service  │
│ on the mesh network between the first media rendering      │
│ device and the second media rendering device is determined.│
│                          430                                │
└─────────────────────────────────────────────────────────────┘
                              │
                              ▼
┌─────────────────────────────────────────────────────────────┐
│ A determination is made to change a configuration of the   │
│ mesh network based on the first parameter and/or the       │
│ second parameter.                                          │
│                          440                                │
└─────────────────────────────────────────────────────────────┘
                              │
                              ▼
┌─────────────────────────────────────────────────────────────┐
│ A steering parameter of an active antenna of the first     │
│ and/or second media rendering device is adjusted.          │
│                          450                                │
└─────────────────────────────────────────────────────────────┘
```

METHOD AND SYSTEM FOR PROVIDING LIMITED CONTROLLER ACCESS TO A MESH NETWORK OF MEDIA RENDERING DEVICES

CROSS-REFERENCE TO RELATED APPLICATIONS

This application is the National Stage of International Application No. PCT/US18/50588, filed Sep. 12, 2018, which claims the benefit of U.S. Provisional Patent Application No. 62/557,360, filed Sep. 12, 2017. The contents of these prior applications are incorporated by reference herein in their entirety.

FIELD OF THE INVENTION

The present invention relates to networked media devices.

BACKGROUND OF THE INVENTION

It has become commonplace for an individual to have access to multiple devices that render media, such as an mp3 player, a car stereo, a home entertainment system, a portable computer or tablet, a gaming console, and a smart phone, among others. Two or more of these rendering devices may have access to a communications network and/or the internet, and be configured to render digital media provided over the communications network and/or the internet, for example, a digital media streaming service.

Unfortunately, continuity of rendering of digital media may be interrupted as a user moves a media rendering device beyond the range of a network, for example a wireless local area network (WLAN), or wishes to add a new media rendering device in a location that is beyond the range of the WLAN. Similarly, a user may wish to control one or more rendering devices via a controller device when the controller is within communication range of at least one media rendering device but out of range of a network access point. Therefore, there is a need in the industry to address one or more of the abovementioned shortcomings.

SUMMARY OF THE INVENTION

Embodiments of the present invention provide a method and system for providing limited controller access to a mesh network of media rendering devices. Briefly described, the present invention is directed to a system that provides limited controller access to a mesh network of media rendering devices in a primary communication network via an access point providing network connectivity to a local area network (LAN). A first media rendering device in communication with the LAN includes a secondary network transceiver providing a secondary network distinct from the LAN. A second media rendering device is in communication with the first media rendering device via the secondary network. A controller is configured to communicate with the first media rendering device via the LAN and/or the secondary network. The first media rendering device is configured to convey a command from the controller to the second media rendering device via the secondary network.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principals of the invention.

FIG. 4 is a flowchart of a method for switching node connections in a mesh networked media rendering system.

DETAILED DESCRIPTION

Figure 1:
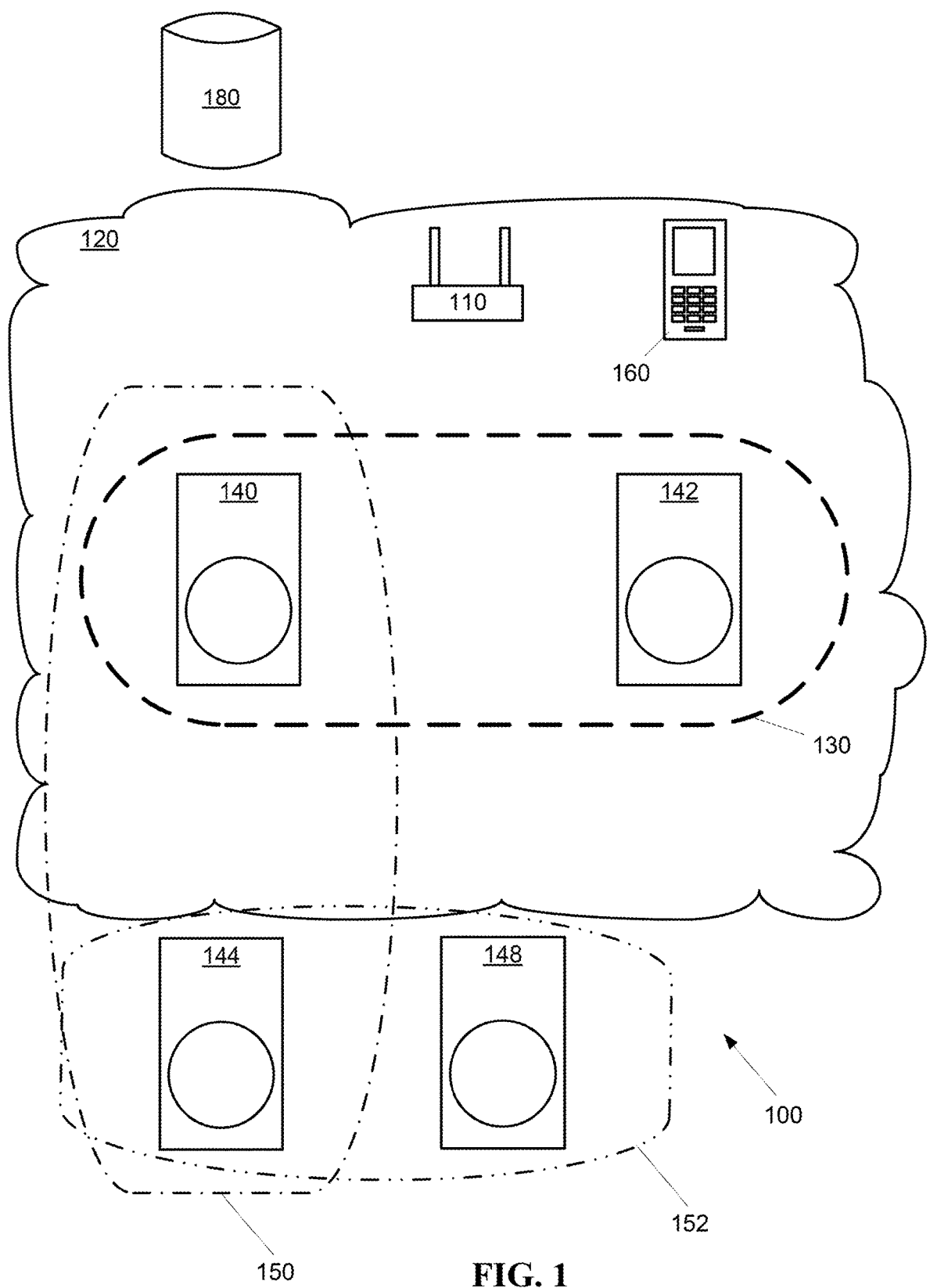
FIG. 1 is a schematic diagram of a first exemplary embodiment of a networked media rendering system.

The following definitions are useful for interpreting terms applied to features of the embodiments disclosed herein, and are meant only to define elements within the disclosure.

As used within this disclosure, a "network" and/or "data network" refers to a communications network configured to exchange binary formatted information between two or more addressable networked devices via one or more routers or devices implementing a data routing protocol, for example, an Internet Protocol (IP) network or a mesh network.

As used within this disclosure, a "mesh network" refers to a network topology of mesh nodes each having a mesh network radio transceiver configured so that each node is able to relay data within the network. Each mesh node may cooperate in the distribution of data within the network. For example, mesh networks can relay messages using either a flooding technique or a routing technique. With routing, a message may be propagated along a path by hopping from node to node until it reaches its destination. The network may allow for continuous connections and may reconfigure itself around broken paths to ensure availability of data paths, for example, using self-healing algorithms such as Shortest Path Bridging Self-healing allows a routing-based network to operate when a node breaks down or when a connection becomes unreliable. Although typically used in wireless situations, wired mesh networks and combination wired/wireless mesh networks are also possible. A mesh network whose nodes are all connected to each other is called a fully connected network. Mesh networks may be considered a type of an ad hoc network.

As used within this disclosure, "media" refers to audio and/or video content either stored on a storage medium, such as a disk drive or digital disk, or streamed from a media server. Media may refer to analog and/or digitally formatted data.

As used within this disclosure, an originating provider of media, either streamed or locally stored, is referred to as a "media source." Examples of a media source include a music and/or video server, an internet radio, a streaming service, or a cache of media files.

As used within this disclosure, "rendering" refers to playback of media by a media player, also referred to herein as a "rendering device." Examples of rendering devices include, but are not limited to, an mp3 player, a tablet computer, a portable stereo, a home entertainment system, a portable video player, a smart phone, a laptop or desktop computer, and a mobile entertainment system.

As used within this disclosure, a "user" refers to a person consuming media from a rendering device and/or controlling media via a media system controller.

As used within this disclosure, a "local device," such as a server, refers to a network element directly connected to a local area network (LAN) or mesh network, while a remote device refers to an item that may be in communication with local network elements, for example, via the internet, but is not directly connected to the LAN or mesh network.

As used within this disclosure, "WiFi" refers to technology for radio wireless local area networking of devices based on the IEEE 802.11 standards.

As used within this disclosure, a "playlist" is a modifiable data structure containing an ordered list of media, or an ordered list of references to media. A playlist may be stored, for example, on a rendering device or a server. A playlist may be modified to add, remove, and/or re-order media or media references. Since playlists containing media references do not contain audio or video content, they are generally small in size and therefore readily transportable. A display playlist is a text listing of media in a playlist, and may include a subset of identifying parameters of a media, such as title, artist, duration, and date, among others.

As used within this disclosure, "streaming" refers to a process of real-time transmitting media of a recording by a source to a rendering device. The rendering device may begin rendering the media before the entire recording has been transmitted. Streaming is generally transitory, such that the streamed data is not retained after it has been rendered. Portions of a received stream may be buffered for rendering, for example, to ensure rendering is uninterrupted during short interruptions of the streamed transmission. In contrast, a downloaded digital multimedia file is generally received in its entirety before it may be rendered. A downloaded digital multimedia file is generally retained in a memory for subsequent rendering, while a streamed file is generally re-streamed for subsequent renderings. "Streaming a song" is shorthand for streaming media of an audio recording identified by a song.

As used within this disclosure, a "controller" refers to a device, for example, a hand held device or an application running on a hand held device configured to interact with a media rendering device, a media source, and/or with one or more groups of media rendering devices. The controller may interact with the media rendering device by issuing commands to adjust one or more operating parameters on the media rendering device, and/or to display operational status of the media rendering device. The controller may interact with a media source to select and control media provided by the media source to one or more media rendering devices. Examples of a hand held device include a smart phone or tablet computer.

It should be noted that while the functionality of system components described herein such as controllers, rendering devices, media servers, and media sources among others may be described separately, alternative embodiments may include devices that combine the functionality of two or more of these components, for example, but not limited to a controller device that also renders media and/or sources media.

Reference will now be made in detail to embodiments of the present invention, examples of which are illustrated in the accompanying drawings. Wherever possible, the same reference numbers are used in the drawings and the description to refer to the same or like parts.

A first embodiment includes a system and method for providing limited controller access to a mesh network of media rendering devices. As shown in FIG. 1, a media rendering system 100 may be used to render stored and/or streamed audio and/or video media via one or more rendering devices 140, 142, 144, for example, an audio transducer. The media rendering system 100 generally includes one or more media rendering devices 140, 142, 144, one or more media servers, and one or more controllers 160. Examples of a media rendering system 100 include an internet enabled home entertainment system. Examples of a media rendering system controller 160 include a tablet computer, and a smart phone. The media rendering system 100 includes one or more media rendering devices 140, 142, 144 communicating in a wired or wireless local area network (LAN) 120. The network access point 110 is configured to provide communications between the media rendering system 100 and the network 180, for example, a local area network in communication with the internet/cloud. The media rendering system 100 may render audio received via from a media source a media stream, for example received from a media server 180. The media server 180 may be a device within the LAN 120, or the media server may be remote to the LAN 120, for example, located in the cloud and accessed through the internet via the access point 110.

The media rendering devices 140, 142 in the media rendering system 100 may communicate via a first private mesh network 130, wherein a first media rendering device 140 connects to the access point 110, and the first media rendering device 140 communicates with a second media rendering device 142 via the first private mesh network 130. The first private mesh network 130 may be, for example, an ad hoc WiFi network operating within the LAN 120. Alternatively, or in addition, two or more media rendering devices 140, 144 in the media rendering system 100 may communicate via a second private mesh network 150, wherein the first media rendering device 140 connects to the access point 110 via the LAN 120, and the first media rendering device 140 communicates with a third media rendering device 144 via the second private mesh network 150. The second private mesh network 150 may be, for example, an ad hoc mesh network, for example, Bluetooth or Zigbee, operating independently the LAN 120. Each of the media rendering devices 140, 142 may include one or more radio for communication with the first and/or second mesh networks 130, 150, and each of the media rendering devices 140, 142 may include one or more active antennas, for example, used to improve overall network reliability.

The range of the second private mesh network 150 may extend beyond the range of the WiFi access point 110. The second mesh network 150 may be used to push data and media to one or more rendering devices 144 across multiple hops. For example, data and/or commands communicated between the first media rendering device 140 and a fourth media rendering device 148 may be first relayed from the first media rendering device 140 to the third media rendering device 144 via the second ad hoc network 150 in a first hop, and subsequently relayed from the third media rendering device 144 to the fourth media rendering device 148 in a second hop, using a second mesh connection 152 of the same type as the second mesh network 150, or a different type from the second mesh network 150. The fourth media rendering device 148 may respond to a received command via the second ad hoc network 150.

Figure 6:
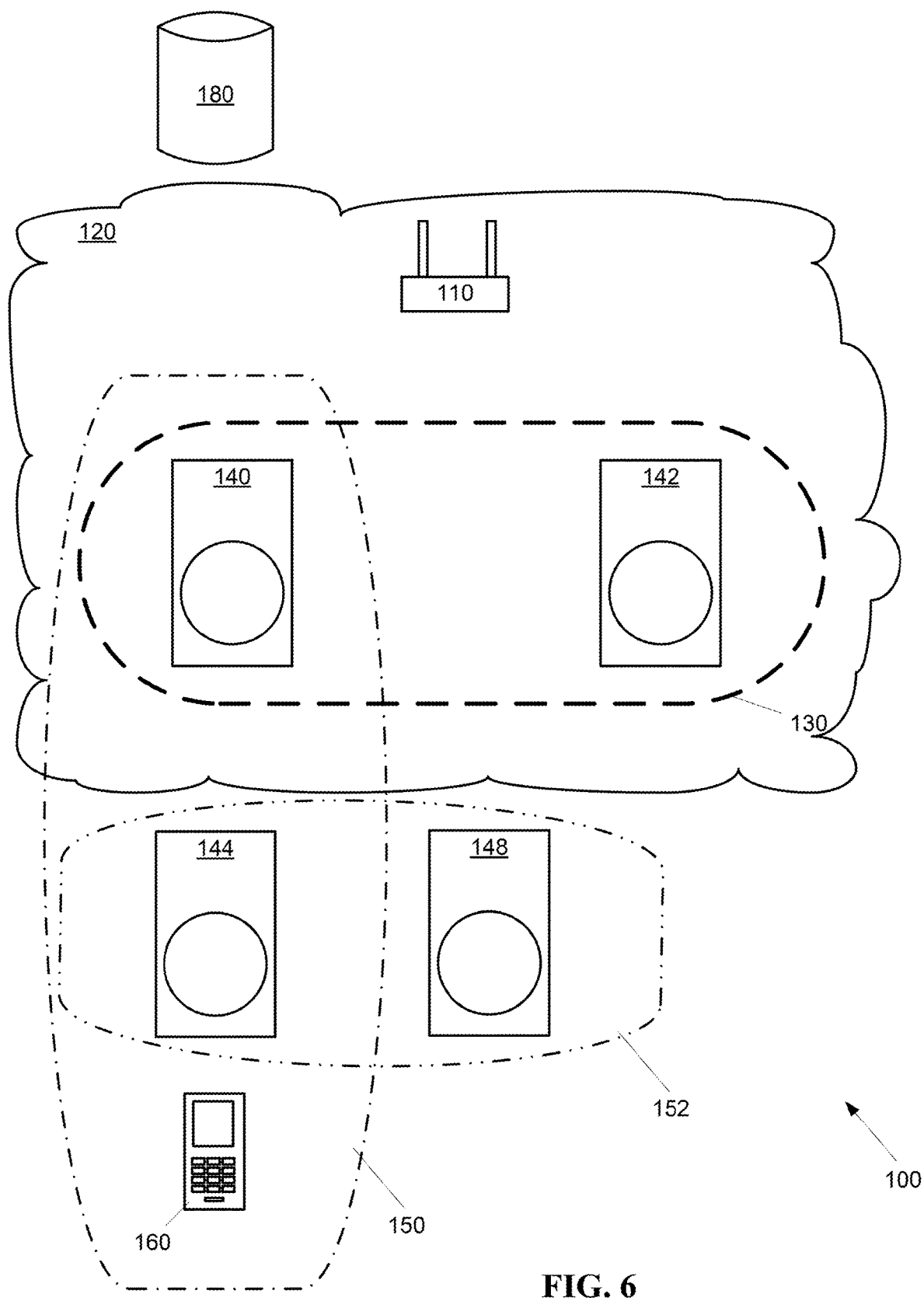
FIG. 6 is a schematic diagram of the first exemplary embodiment of a networked media rendering system of FIG. 1, where the controller is outside the range of the LAN.

The media rendering system controller 160 may operate as an application ("app") running on a host device, such as a smart phone or tablet. In previous systems, the controller communicates with the media rendering system solely via the WiFi access point. In exemplary embodiments, as shown in FIG. 6, the controller 160 may operate beyond the range of the WiFi access point 110, connecting to the system via the second private mesh network 150, for example, when the controller 160 is located beyond the range of the WiFi access point 110. The use of the second private mesh network 150 by the controller 160 may be limited to specific types of data, for example control commands. Alternatively, or in addition, use of the second private mesh network 150 by the controller 160 may be bandwidth limited, so that the performance of the controller 160 does not interfere with the performance of the media rendering system 100. The user of the controller 160 may be notified that network access of the controller is limited. The types of devices allowed to join the second mesh network 150 may be limited to, for example, devices hosting a specific application, or to recognized devices, for example, devices with a recognized MAC address. In general, the controller 160 may not be allowed to join the second mesh network 150 if the controller is in communication with the WiFi access point 110 of the LAN 120.

In an alternative embodiment, the secondary network 150 may represent functionality of a 'WiFi repeater," that serves to extend the range of the LAN 120. For example, a WiFi repeater may be a media rendering device 140 that acts as an OSI (open systems interconnection) layer 1 (physical layer) passive or 'dumb' device that rebroadcasts a received frame so as to extend the useful range to the WiFi access point 110. Being a passive device means they can extend the range of a controller device, such as iOS and Android devices without requiring the controller device to reconnect directly to the speaker. For example, the first media rendering device 140 extends the range of the WiFi access point 110 of the LAN 120 so that the third media rendering device 144 can communicate with the LAN 120 while otherwise being physically located beyond the operating boundaries of the LAN 120.

The repeater functionality of the first media rendering device 140 may be implemented using different OSI layer 1 implementations. For example, the physical layer connection between the first media rendering device 140 and the third media rendering device 144 may be via a different networking protocol from the LAN 120, for example, via BlueTooth while the LAN 120 uses wireless internet protocol. Bluetooth may be desirable in a repeater as it may provide internet protocol (IP) connectivity at much lower power than WiFi. The scope of the network may also be extended via a wired connection, for example, an Ethernet connection between the third media rendering device 144 and the fourth media rendering device 148.

Figure 7:
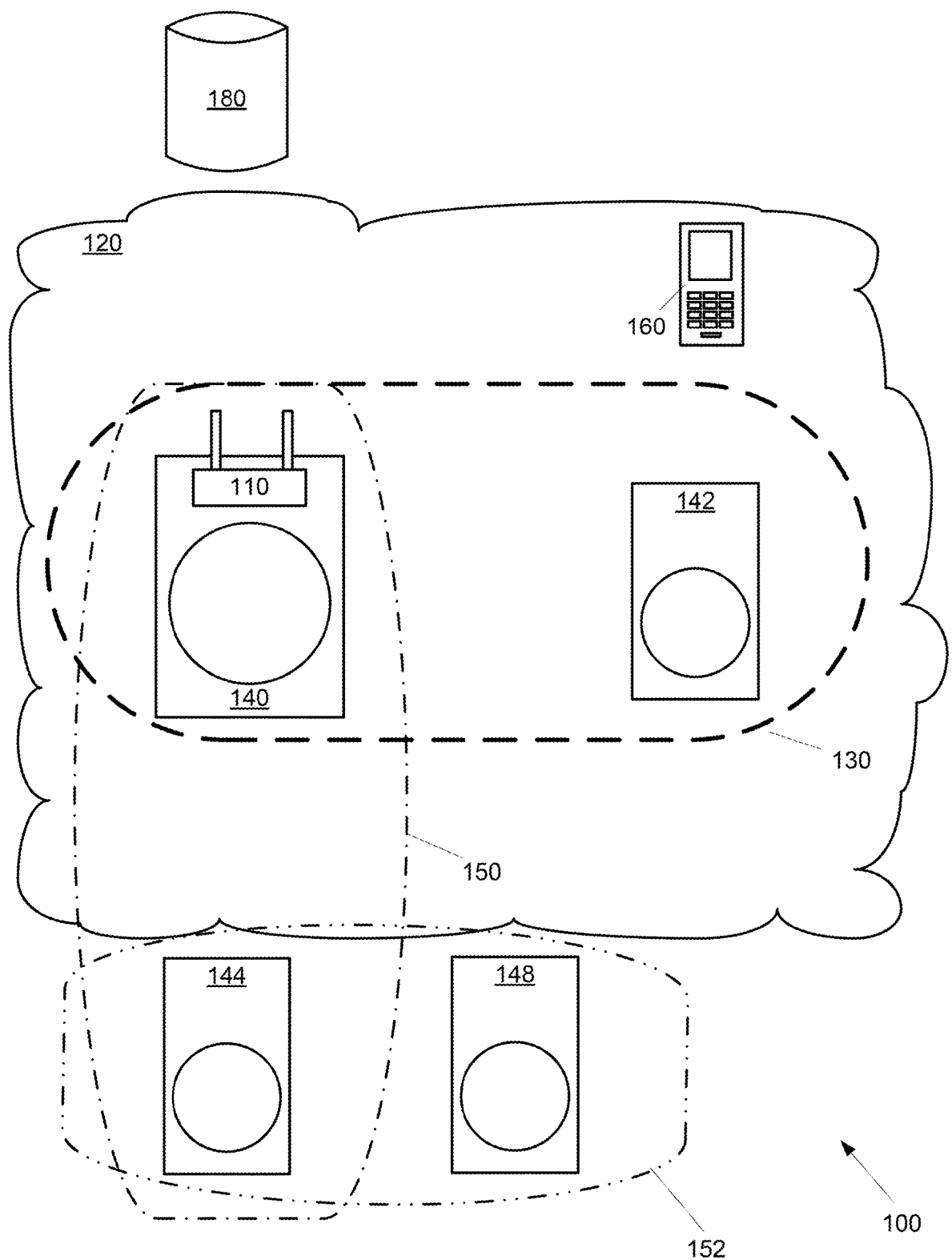
FIG. 7 is a schematic diagram of the first exemplary embodiment of a networked media rendering system of FIG. 1, where the access point is housed within a media rendering device.

While FIG. 1 shows a WiFi access point 110 independent from the first media rendering device, the functionality of a LAN access point may be incorporated within a housing of the first media rendering device 140 itself, as shown in FIG. 7. Therefore the IP coverage of the controller 160 may be extended without making the controller 160 disconnect from the LAN and/or access point 110 and the controller 160 may select the types of traffic that are routed through the access point 110 and they types of traffic that are passed between/among the media rendering devices 140, 142, 144. For example, the controller 160 may configure the media rendering system 1000 to rout transmission of high bandwidth content to less congested links of the network. The selection of the type of traffic that is routed through the access point and traffic routed between/among media rendering devices may be a user configurable parameter.

Figure 2A:
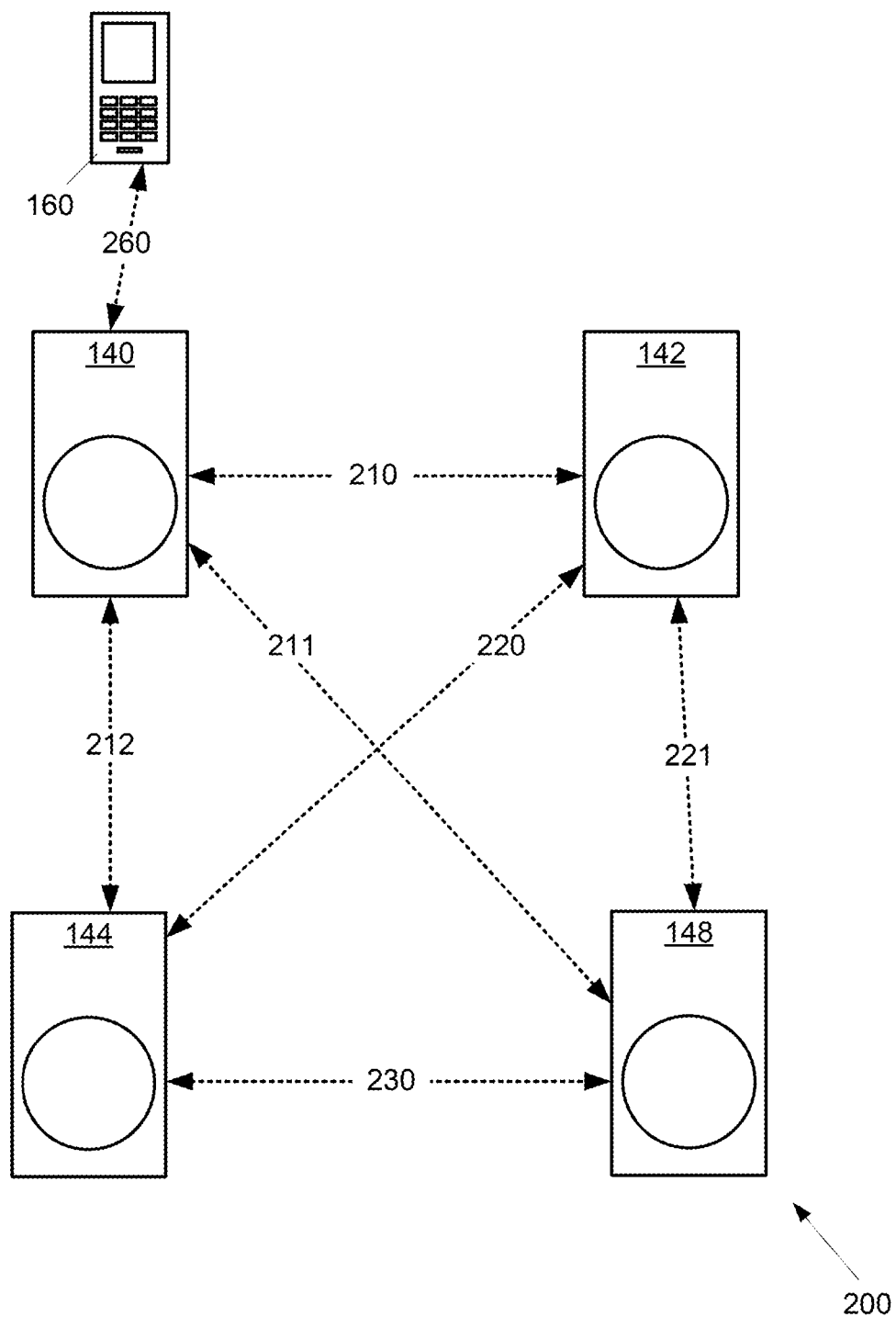
FIG. 2A is a detail of a first mesh network under the first embodiment.

FIG. 2A is a detail 200 of the mesh network under the first embodiment. Here, the controller 160 has a direct mesh network connection 260 with the first media rendering device 140. Under the second embodiment, each of the media rendering devices 140, 142, 144, 148 has a direct mesh network connection 210, 211, 212, 220, 221, 230 with three other media rendering devices 140, 142, 144, 148. As pictured, the controller 160 may communicate directly with the first media rendering device 140 via the direct mesh network link 260, and may communicate with each of the second 142, third 144, and fourth 148 media rendering devices via a one-hop connection from the first media rendering device 140.

Figure 2B:
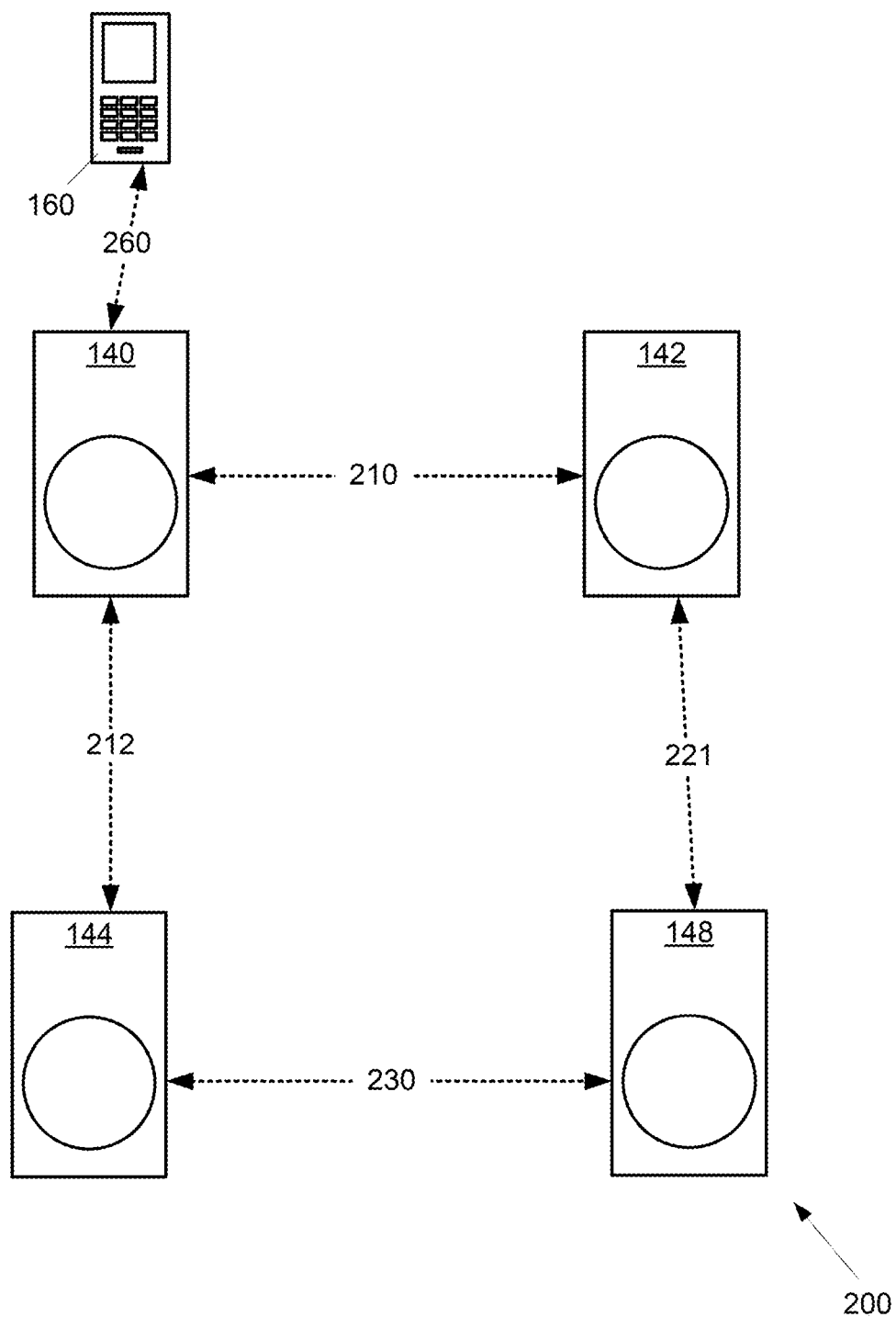
FIG. 2B is a detail of a second mesh network under the first embodiment.

While FIG. 2A shows a mesh network where all of the media rendering devices 140, 142, 144, 148 are connected to one another via direct mesh network connections 210, 211, 212, 220, 221, 230, in some embodiments there is only partial connectivity, where only some of the media rendering devices 140, 142, 144, 148 have direct network connections 210, 212, 220, 230, as shown in FIG. 2B. Here, each of the media rendering devices 140, 142, 144, 148 has a direct mesh network connection with only two other media rendering devices 140, 142, 144, 148, so that communications between two media rendering devices 140, 142, 144, 148 that are not directly connected may occur indirectly using a one-hop connection between an intermediate media rendering device, so that the intermediate media rendering devices serve as mesh network repeaters. For example, in FIG. 2B the first media rendering device 140 has a direct mesh network connection with the second media rendering device 142 and the third media rendering device 144, but a one hop mesh network connection with the fourth media rendering device 148, via either the second media rendering device 142 or the third media rendering device 144. Likewise, the controller 160 may connect to the second media rendering device 142 or the third media rendering device 144 via a first-hop connection 260 with the first media rendering device 140, and a second-hop connection 210, 212 to the second media rendering device 142 or the third media rendering device 144. The controller 160 may connect to the fourth media rendering device 148 via three mesh network hops: (260, 210, 221), or (260, 212, 230). As long as there is a mesh network path between any two media rendering devices, these two media rendering devices can communicate via direct or multi-hop transmissions.

A second exemplary embodiment of the present invention generally relates to a method and system for optimizing network connectivity through a combination of a mesh network and one or more adaptive antennas. Under the second exemplary embodiment, the media rendering devices 140, 142, 144, 148 in a media rendering system may communicate via a private mesh network, wherein a first media rendering device 140 connects to a WiFi access point 110, and the media rendering devices 140, 142, 144, 148 communicate via the private mesh network. The range of the private mesh network may extend beyond the range of the WiFi access point. The mesh network may be used to push data and media to rendering devices across multiple hops.

The first media rendering device 140 includes one or more active antennas configured to transmit and/or receive data on the mesh network. Active antenna systems have been developed in which an individual antenna or groups of antennas are driven with their own active electronics. Such antenna systems are capable of amplifying a WiFi signal within the antenna, eliminating loss in signal strength, and avoiding noise during transmission. Active antennas may be configured to identify a signal, determine what beam to access at any given time, and steer the beam in a direction of interest to provide an enhanced signal. In alternative embodiments, some or all of the antennas within a media rendering device may not be active.

Figure 3A:
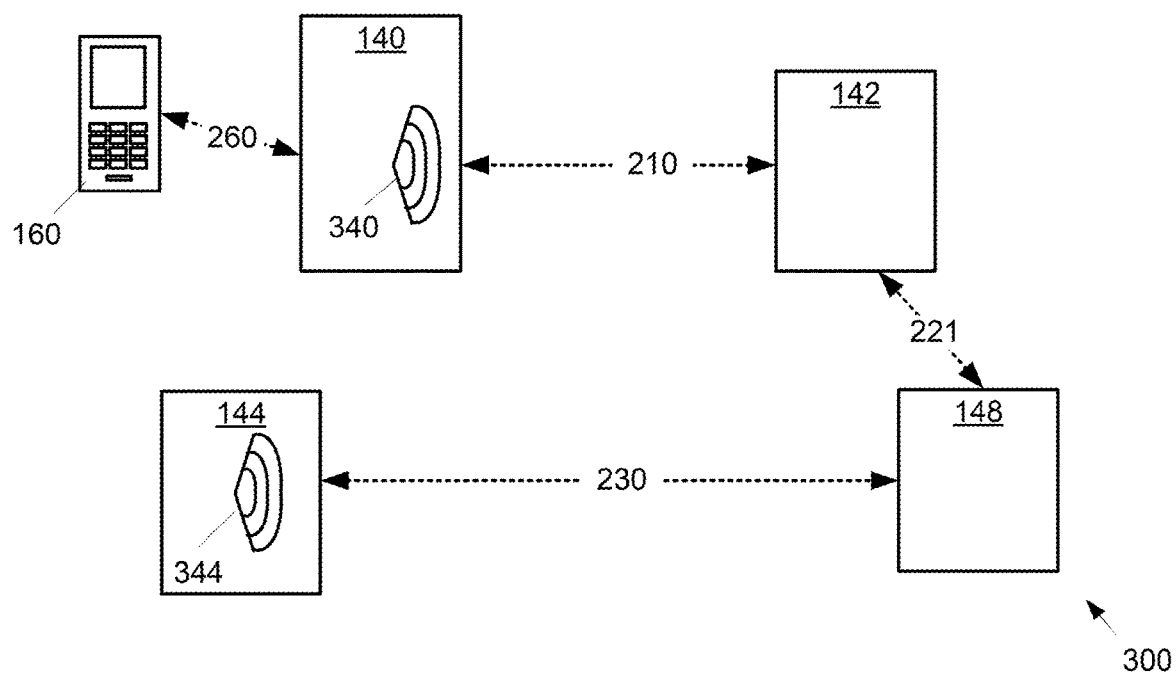
FIG. 3A is a detail showing a first orientation of directional antennas under the second mesh network of FIG. 2B.

The second embodiment, shown in FIG. 3A, combines media rendering devices 140, 142, 144, 148 in a mesh network 210, 221, 230 with one or more active antennas to provide network optimization. In particular, the mesh network (functioning alone) continuously searches for the best signal source and, in the event a signal source better than the current source is found, makes a hop to the better signal source.

For example, FIG. 3A shows a first media rendering device 140 with a first active antenna 340 configured to optimize communication with the second media rendering device 142 via the direct mesh network link 210. For example, the first active antenna 340 is configured to steer transmission/reception orientation to enhance communication parameters with the second media rendering device 142. It should be noted that while the drawings indicate a physical orientation of the active antennas 340, 344, this is just a visual aid to indicate a functional orientation that may or may not involve physical orientation of the active antenna. The active antenna may be implemented as a programmable antenna for transmitting electronically steerable beams.

The third media rendering device 144 includes a third active antenna 344 where the third active antenna 344 is configured to steer transmission/reception orientation to enhance communication parameters with the fourth media rendering device 148 via the direct mesh network link 230. As shown in FIG. 3A, a command from the controller 160 may traverse multiple hops before arriving at the second media rendering device 144.

Figure 3B:
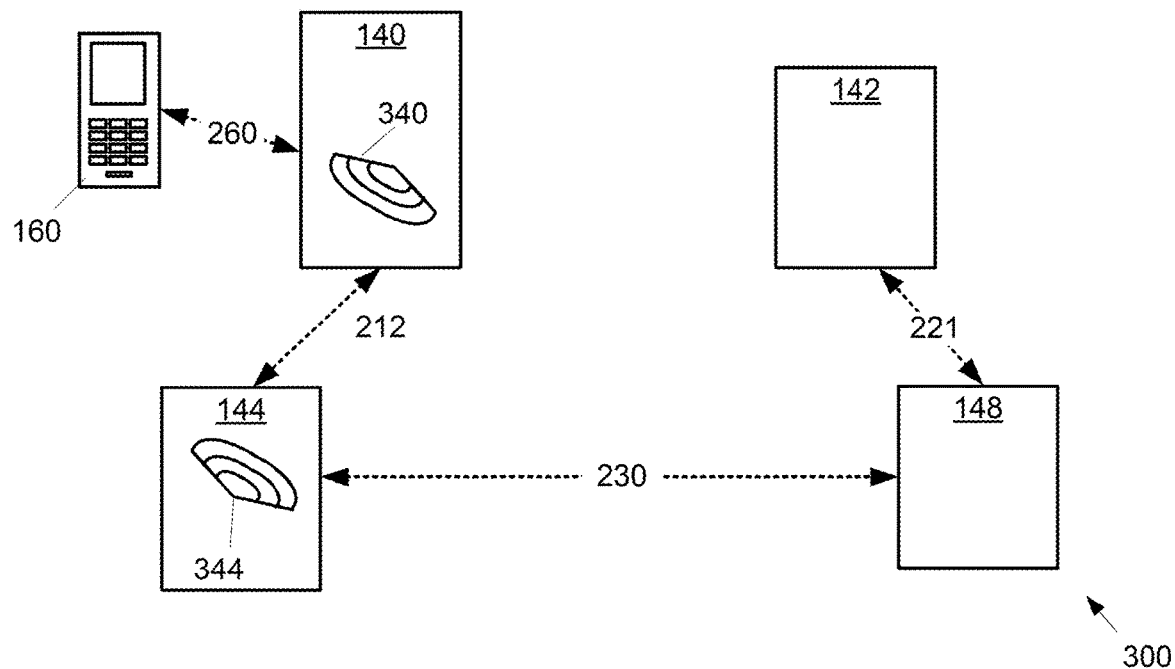
FIG. 3B is a detail showing a second orientation of directional antennas under the second mesh network of FIGS. 2B and 3A.

FIG. 3B shows the same network as FIG. 3A, but with the first active antenna 340 configured to optimize communication with the third media rendering device 144 via the direct mesh network link 212. The third active antenna 344 where the third active antenna 344 is similarly configured to steer transmission/reception orientation to enhance communication parameters with the first media rendering device 140 via the direct mesh network link 212. As shown in FIG. 3B, a command from the controller 160 may traverse two hops before arriving at the second media rendering device 144.

As noted above, the mesh network continuously searches for the best signal source. The criteria for what constitutes the "best signal source" may be configurable. For example, depending upon the priorities of the network, the criteria for "best signal source" may include least bandwidth, fewest dropped packets, and/or strongest signal power, among other possible criteria. However, configuring one or more active antenna 340, 344 according to the best signal source may result in a signal transmission hop that may not provide the optimal connectivity (or may even provide poor connectivity) from the perspective of the active antenna. Thus, the second embodiment provides a system in which the active antenna and the mesh network synergistically determine optimal conditions. Various criteria may be considered when deciding when to reconfigure the network, for example, but not limited to signal-to-noise ratio, number of packet drops, traffic throughput, availability of a lower traffic link, air-time utilization, signal interference, data source (e.g. internet vs local), and the number of renderers playing the same media in synchrony, among others. The mesh algorithm calculates the best topology based on all the criteria above and heuristics. Control signal paths are created between the active antenna and the mesh network such that when the mesh network is reconfigured, the active antenna is also reconfigured. The combined reconfiguration results in enhanced performance. The mesh network configuration may be distributed across two or more media rendering devices, and/or the controller or another external mesh network controlling device.

FIG. 4 is a flowchart of a method for switching node connections in a mesh networked media rendering system. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention. The method is described with reference to elements shown in FIG. 1.

A mesh network is configured for a first media rendering device 140, a second media rendering device 140, and a third media rendering device 144, as shown by block 410. A first parameter measuring a signal quality on the mesh network 210 between the first media rendering device 140 and the second media rendering device 142 is determined, as shown by block 420. For example, the first parameter may measure signal strength, or signal-to-noise ratio. A second parameter measuring quality of service on the mesh network 210 between the first media rendering device 140 and the second media rendering device 142 is determined, as shown by block 430. For example, the first parameter may measure volume of traffic, or a rate of dropped packets. A determination is made to change a configuration of the mesh network based on the first parameter and/or the second parameter, as shown by block 440. For example, the first and second parameters may be analyzed to weigh the advantages of steering an antenna from a stronger signal to a weaker signal, and compared against one or more thresholds measuring the quality of service likely to be present in an alternative network path if a path switch was implemented. The first parameter may be, for example, received signal strength, and the second parameter may be hop count. While the alternative route has a weaker signal, it may have has less hops, so in fact may provide a more reliable path for a weighting based on air-time-utilization. This may be calculated by multiplying hops, transmission speed, and average retries, and selecting the link with the lower air-time utilization.

Steering parameters may be updated simultaneously with each new connection to the mesh network. Steering may be viewed as being akin to a larger antenna, in that it improves signal strength. In the event that the result of a mesh network switch is deemed to be beneficial to network throughput, a steering parameter of an active antenna 340 of the first and/or second media rendering device is adjusted. For example, as shown in FIGS. 3A-3B, the first active antenna 340 of the first media rendering device 140 may be steered from being oriented toward the second media rendering device 142 (FIG. 3A) to being steered toward the third media rendering device 144 (FIG. 3B). As a result, the mesh network link 210 (FIG. 3A) between the first media rendering device 140 and the second media rendering device 142 may be dropped in favor of a newly negotiated mesh network link 212 (FIG. 3B). The negotiation of adding and dropping of the mesh network links 210, 212 is known to persons having ordinary skill in the art, and is not described herein.

Figure 5:
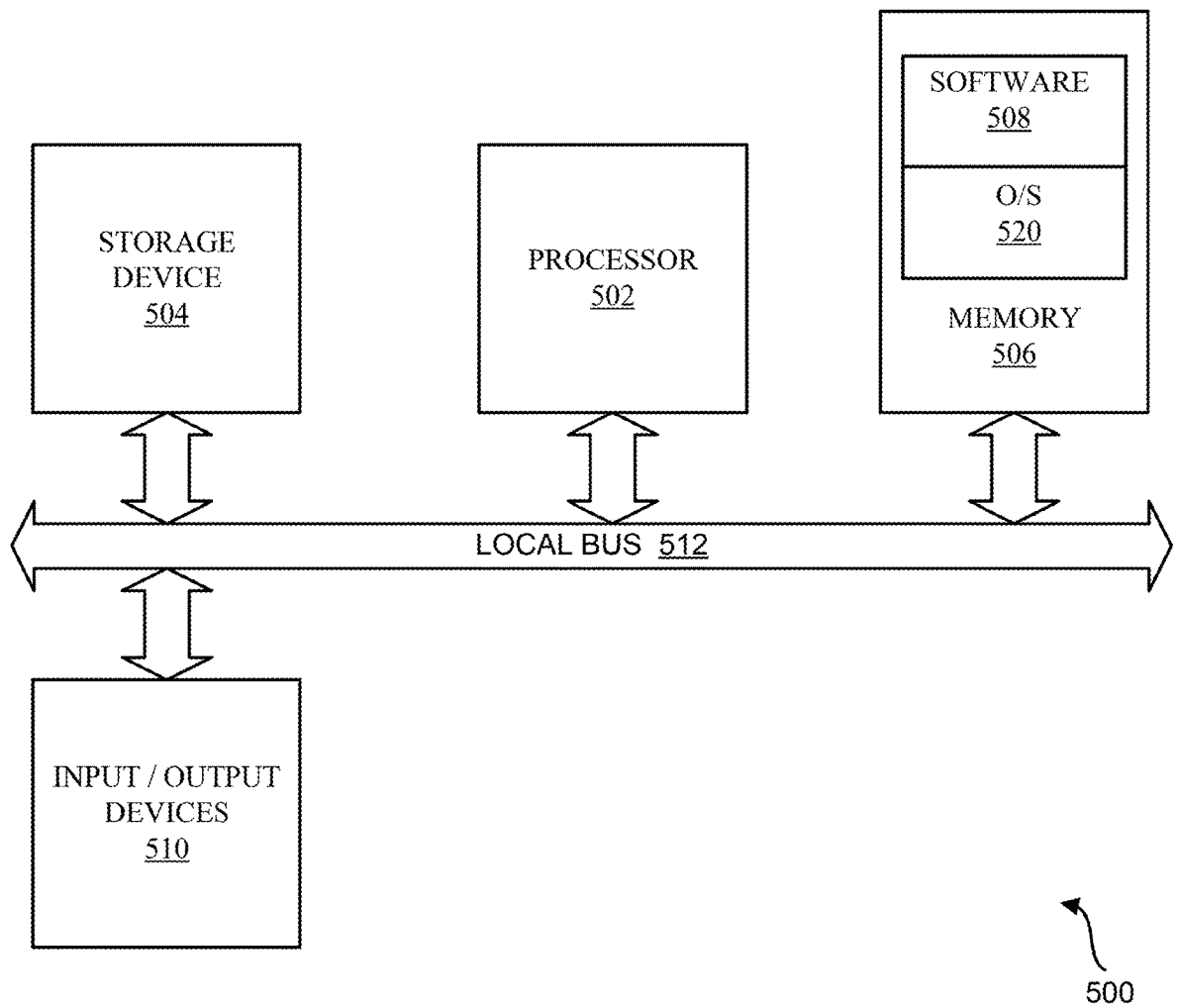
FIG. 5 is a schematic diagram illustrating an example of a system for executing functionality of the present invention.

The present system for executing the functionality described in detail above may include a computer, an example of which is shown in the schematic diagram of FIG. 5. The system 500 contains a processor 502, a storage device 504, a memory 506 having software 508 stored therein that defines the abovementioned functionality, input and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a microprocessor, or generally any device for executing software instructions.

The memory 506 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A system for providing limited controller access to a mesh network of media rendering devices in a primary communication network via an access point providing network connectivity to a local area network (LAN), comprising:

a first media rendering device in communication with the LAN comprising a secondary network transceiver providing a secondary network distinct from the LAN, wherein the first media rendering device is in communication with the access point;

a second media rendering device in communication with the first media rendering device via a first private mesh network;

a third media rendering device in communication with the first media rendering device via the secondary network; and a controller configured to communicate with the first media rendering device via the LAN and/or the secondary network, wherein the first media rendering device is configured to convey a command from the controller to the third media rendering device via the secondary network, and wherein a range of the secondary network extends beyond the access point, and wherein use of the secondary network by the controller is bandwidth limited, so that performance of the controller does not interfere with performance of the system.

2. The system of claim 1, wherein the secondary network comprises a mesh network.

3. The system of claim 2, wherein the access point further provides a communication link with a wide area network (WAN).

4. The system of claim 2, further comprising the access point and a housing configured to house the access point and the first media rendering device.

5. The system of claim 2, wherein the first media rendering device and/or the second media rendering device further comprises a programmable antenna for transmitting electronically steerable beams.

6. The system of claim 2, wherein the first media rendering device is configured to convey a response to the command to the controller from the third media rendering device via the secondary network.

7. The system of claim 1, wherein the controller may operate beyond a range of the access point, the controller connecting to the system via the second network when the controller is beyond the range of the access point.

* * * * *